United States Patent [19]

Takamiya

[11] Patent Number: 5,718,084
[45] Date of Patent: Feb. 17, 1998

[54] GLASS RUN OF VEHICLE DOOR

[75] Inventor: Takeomi Takamiya, Narita, Japan

[73] Assignee: Kinugawa Rubber Ind. Co., Ltd., Chiba, Japan

[21] Appl. No.: 713,516

[22] Filed: Sep. 13, 1996

[30] Foreign Application Priority Data

Sep. 19, 1995 [JP] Japan ................................. 7-238913

[51] Int. Cl.⁶ ............................................... E05D 15/16
[52] U.S. Cl. ........................................ 49/440; 49/479.1
[58] Field of Search ........................... 49/475.1, 479.1, 49/495.1, 440, 441

[56] References Cited

U.S. PATENT DOCUMENTS

| | | | |
|---|---|---|---|
| 4,616,446 | 10/1986 | Okamoto | 49/479.1 X |
| 4,894,953 | 1/1990 | Nozaki | 49/479.1 X |
| 4,894,954 | 1/1990 | Nozaki et al. | 49/479.1 |
| 4,910,919 | 3/1990 | Kisanuki et al. | 49/479.1 |
| 4,977,706 | 12/1990 | Kisanuki | 49/479.1 |
| 5,155,938 | 10/1992 | Nozaki | 49/479.1 X |
| 5,195,274 | 3/1993 | Mishima et al. | 49/441 |

FOREIGN PATENT DOCUMENTS

| | | | |
|---|---|---|---|
| 2-17421 | 2/1990 | Japan . | |
| 4063721 | 2/1992 | Japan | 49/479.1 |
| 2 217 761 | 11/1989 | United Kingdom . | |
| 2 273 951 | 7/1994 | United Kingdom . | |

*Primary Examiner*—Jerry Redman
*Attorney, Agent, or Firm*—Foley & Lardner

[57] ABSTRACT

A glass run installed to a vehicle door is comprised of a horizontal portion, a vertical portion and a corner portion integrally connecting the horizontal and vertical portions. The horizontal portion has an outer lip at which an upper end portion of a door glass is received. The corner portion has a groove which is formed along an extension line of a lower periphery of the outer lip and is defined by a thin wall. Therefore, the corner portion is deformed in the vicinity of the groove so as to absorb tensile force applied to the corner portion when the door glass pushes the lip portion.

13 Claims, 4 Drawing Sheets

FIG.5 (PRIOR ART)
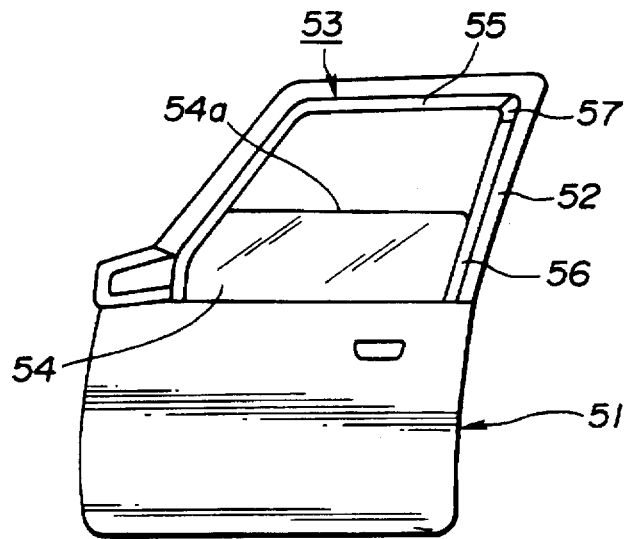
FIG.6 (PRIOR ART)
FIG.7 (PRIOR ART)
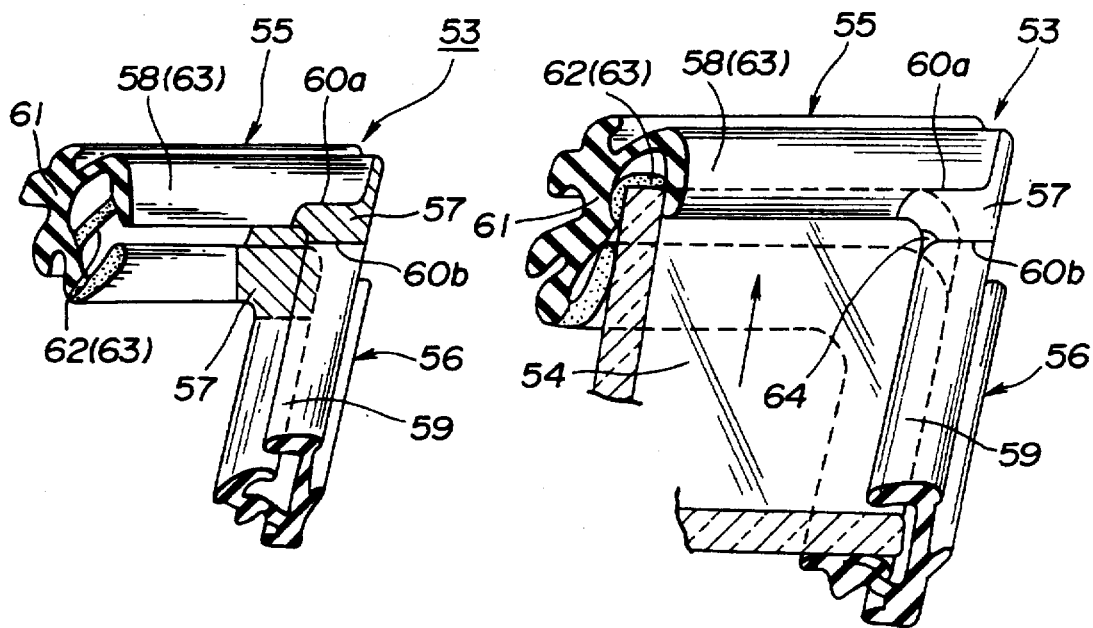

GLASS RUN OF VEHICLE DOOR

BACKGROUND OF THE INVENTION

1. Field of the Invention

The present invention relates to improvements in a glass run for a vehicle door, and more particularly to a corner connecting structure between a glass-run horizontal portion and a glass-run vertical portion.

2. Description of the Related Art

A Japanese Utility Model Provisional Publication No. 2-17421 discloses a door glass run structure. As shown in FIGS. 5 and 6, such a conventional glass run 53 is installed along an inner periphery of a door frame 52 of a vehicle door 51 and is constituted by a glass-run horizontal portion 55, a glass-run vertical portion 56 and a corner portion 57 through which the glass-run horizontal and vertical portions 55 and 56 are connected. The corner portion 57 is formed by means of a die forming method where an end portion of the glass-run horizontal portion 55 and an end portion of the glass-run vertical portion 56 are installed in a die and are integrally connected through the corner portion 57. Since an outer lip 58 of the glass-run horizontal portion 55 and an outer lip 59 of the glass-run vertical portion 56 unavoidably form connecting surfaces 60a and 60b with respect to the corner portion 57, the outer lips 58 and 59 are smoothly and continuously connected to the corner portion 57 so as not to form a step at the connecting surfaces 60a and 60b. Further, the outer lip 58 and a bridging seal lip 62 formed between the outer lip 58 and a main body portion 61 define a hollow lip 63.

However, since an upper end 54a of a door glass 54 pushingly deforms the seal lip 62 when the door glass 54 is fully raised up to the upper limit position, the hollow lip 63 is deformed in the upward direction. Therefore, the lower connecting surface 60b intensively receives tensile force according to the compressing deformation of the hollow lip 63. This force may generate a crack 64 as shown in FIG. 7. Since the connecting surfaces 60a and 60b connect extruded members and a die formed portion, the strength at the connecting surfaces 60a and 60b is not sufficient for tensile force as compared with that of the other portions. Particularly, in a case that a C-shaped core bar is embedded in the glass-run vertical portion 56, the stretching deformation of the glass-run vertical portion 56 is suppressed in the longitudinal direction and therefore the generation of cracks at the connecting portion 60b is further accelerated.

SUMMARY OF THE INVENTION

It is an object of the present invention to provide an improved glass run which is arranged to prevent a concentration of stress to a connecting portion between a corner portion and a vertical portion of the glass run.

A glass run according to the present invention is disposed along an inner periphery of a door frame of a vehicle door. The glass run comprises a glass-run horizontal portion, a glass-run vertical portion and a corner portion. The glass-run horizontal portion receives press force of a door glass when the door glass is fully raised up. The glass-run vertical portion guides a side of the door glass. The corner portion connects the glass-run horizontal portion and the glass-run vertical portion. The corner portion includes a first connecting surface between the glass-run horizontal portion and the corner portion, a second connecting surface between the glass-run vertical portion and the corner portion, and a groove extending along an extension line of a lower periphery of an outer side of the glass-run horizontal portion. A thickness of the corner portion corresponding to the groove is formed partially thinner than others of the corner portion. The second connecting surface is located at a position that is lower than an outer lower periphery of the glass-run horizontal portion.

With this arranged glass run, even if tensile force due to the force of the door glass is applied to the corner portion, a relatively large deformation is occurred in the vicinity of the groove. Therefore, almost all of the tensile force applied to the corner portion is received by the deformation of the groove of the corner portion, and the load applied to the second connecting surface becomes small. This prevents the second connecting portion from generating a crack due to stress concentration. Further, since the position of the groove is located on the extension line of a lower periphery of the outside lip of the glass-run horizontal portion, the outside view of the door glass run is more aesthetic.

BRIEF DESCRIPTION OF THE DRAWINGS

FIG. 5 is a front view of a vehicle door in which the glass run according to the present invention may be utilized;

FIG. 6 is a partial perspective view of a conventional glass run; and

FIG. 7 is a partial perspective view of FIG. 6 where a door glass is fully raised up.

DETAILED DESCRIPTION OF THE INVENTION

Figure 1:
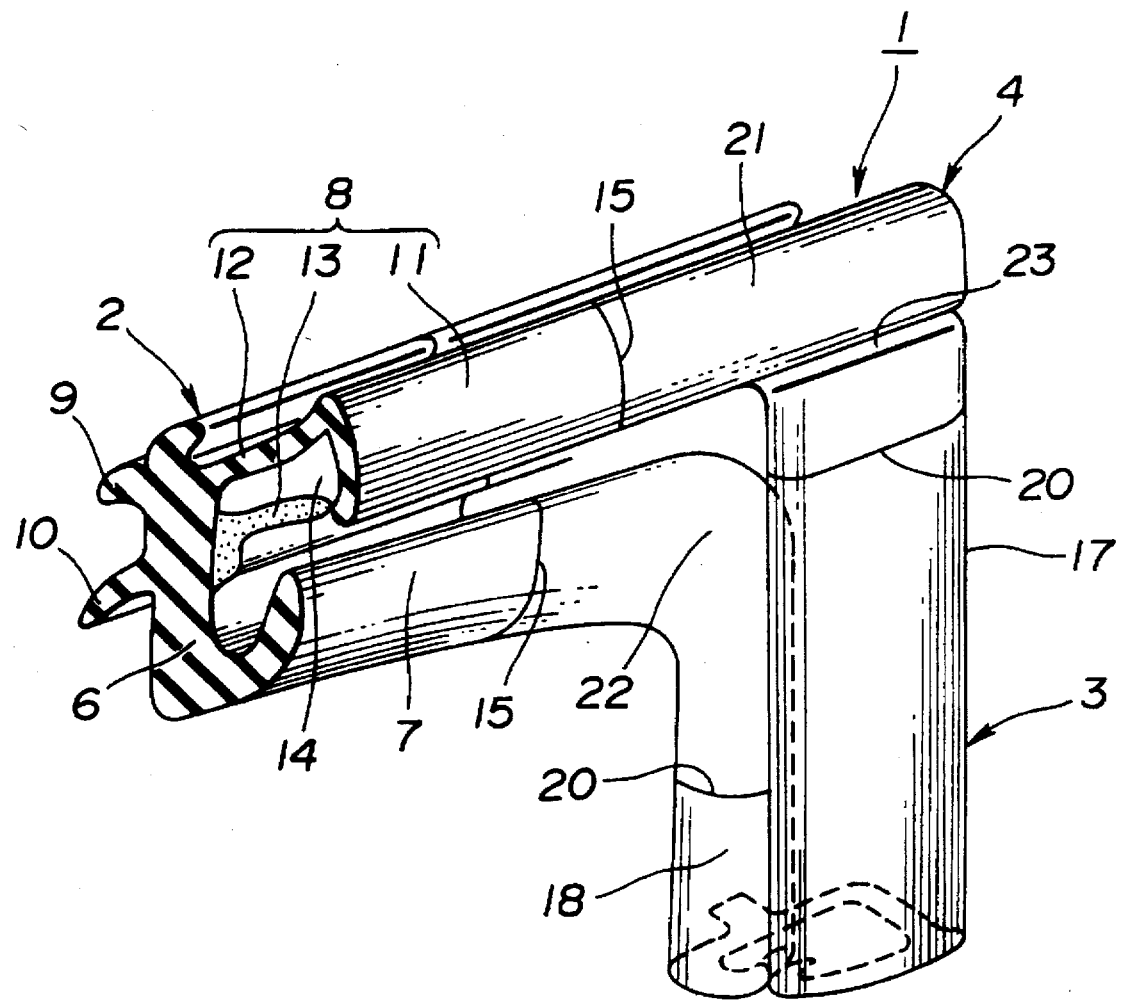
FIG. 1 is a partial perspective, view of a glass run of an embodiment according to the present invention.

Referring to FIGS. 1 to 4, there is shown a first embodiment of a door glass run 1 installed to a vehicle door in accordance with the present invention. Where applicable, like reference numerals will be utilized to refer to parts common to the glass run structure described above in the prior art. The door glass run 1 comprises a glass-run horizontal portion 2 which is disposed along an upper portion of a door frame 52 of an automotive vehicle, a glass-run vertical portion 3 extending downward from an end portion of the glass-run horizontal portion 2, and a corner portion 4 through which the glass-run horizontal and vertical portions 2 and 3 are connected. The door frame 52 of the vehicle door 51 may be the same as that shown in FIG. 5. A door glass 5 is installed in the vehicle door 51 so as to be openly and closely slid in the door frame 52. An upper end portion of the door glass 5 shown in FIG. 4 compresses the glass-run horizontal portion 2 when the door glass 5 is raised up to an upper limit position. The glass-run vertical portion 3 functions to guide the door glass 5 during when the door glass 5 is openly and closely slid in the door frame 53.

The glass-run horizontal portion 2 is constituted by a main body 6 of a relatively thick member, a seal lip 7 which is integrally formed with the main body 6 to obliquely project from a lower end portion of the main body 6 so as to be slidably in contact with the door glass 5, a hollow lip 8 that is of a compressed shape and is integrally formed with the main body 6 to project from an upper end portion of the main body 6, and auxiliary lips 9 and 10 that project from a back surface of the main body 6. The glass-run horizontal portion 2 is engaged with the door frame 52 through a retainer (not shown). The hollow lip 8 is constituted by an outer lip 11, a supporting lip 12 disposed between the outer lip 11 and the main body 6, and a seal lip 13. The outer lip 11, the supporting lip 12, the main body 6 and the seal lip 13 define a hollow space 14. When the door glass 5 is raised up to the upper limit position, the upper portion of the door glass 5 is press-contacted with the seal lip 13. The seal lip 13 of the glass-run horizontal portion 2 is formed by sponge rubber, and the other portions thereof are formed by solid rubber. At a first connecting surface 15 shown in FIG. 4, the corner portion 4 is connected with an end of the glass-run horizontal portion 2 so that the first connecting surface 15 is generally perpendicular with respect to the longitudinal direction (horizontal direction) of the glass-run horizontal portion 2. Thus, the glass-run horizontal portion 2 and the corner portion 4 are connected at the first connecting surface 15.

Figure 2:
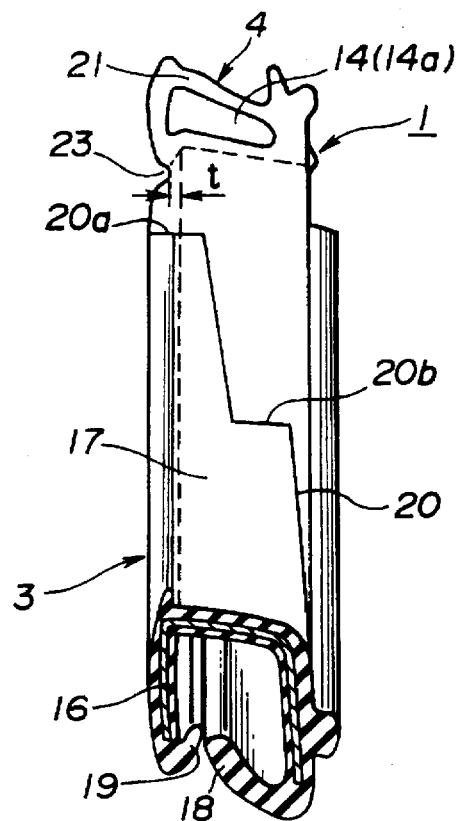
FIG. 2 is a side view of the embodiment of FIG. 1.
Figure 3:
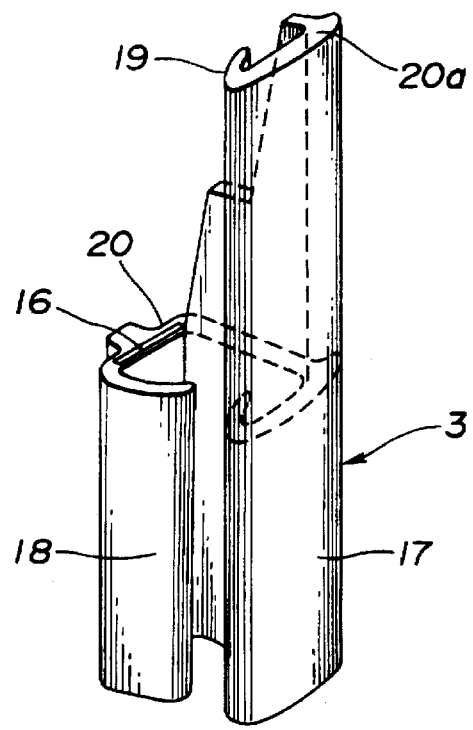
FIG. 3 is a perspective view showing an end portion of a glass-run vertical portion of the embodiment of FIG. 1.
Figure 4:
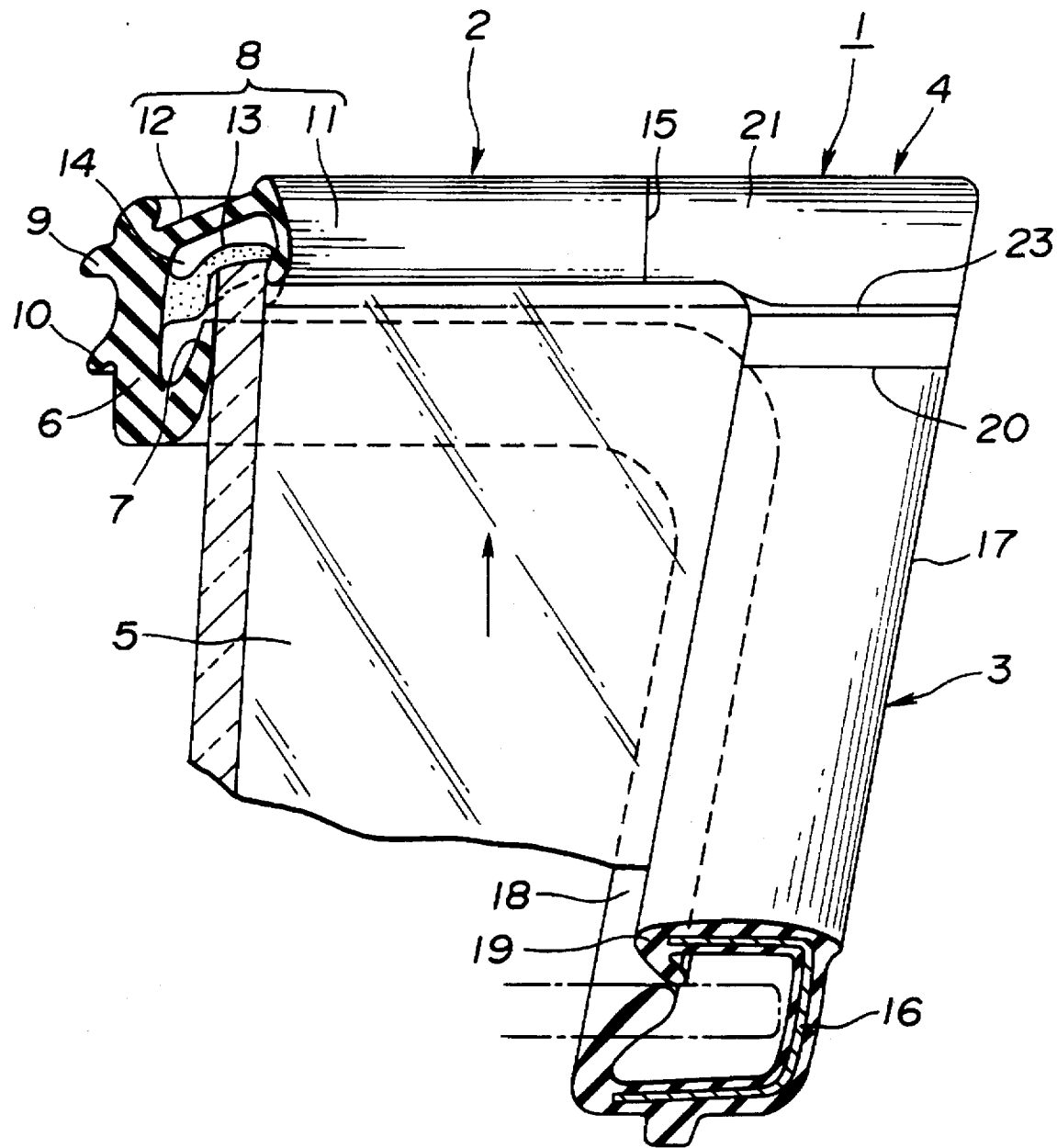
FIG. 4 is a front view of a part of the glass run of the embodiment where a door glass is fully raised up.

On the other hand, the glass-run vertical portion 3 is constituted by a channel-shaped main body 17 in which a C-shaped core-member 16 is embedded, and seal lips 18 and 19 that respectively extend inwardly from ends of the channel-shaped main body 17. The glass-run vertical portion 3 is generally formed into a C-shape in cross-section and is engaged with a vertical side of the door frame 52 along a center pillar. A second connecting surface 20 is formed at an end portion of the glass-run vertical portion 3 to be connected with the corner portion 4. The second connecting surface 20 is formed to have a first step 20a and a second step 20b as shown in FIG. 2 and FIG. 3. That is, the first step 20a of the outer side is higher in height level than the second step 20b of the inner side.

More particularly, as shown in FIG. 1, the corner portion 4 includes a corner hollow lip portion 21 that is continuous with the hollow lip 8 of the glass-run horizontal portion 2 and has a cross-section as same as that of the glass-run horizontal portion 2, and a corner lip portion 22 that has a cross-section as same as that of the seal lips 7 and 18 of the glass-run horizontal portion 2 and the glass-run vertical portion 3. The hollow lip 8 of the glass-run horizontal portion 2 is continuously connected to the main body 17 of the glass-run vertical portion 3 through a corner hollow lip portion 21. The seal lips 7 and 18 of the glass-run horizontal portion 2 and the glass-run vertical portion 3 are continuously connected with each other through the corner seal lip portion 22.

A groove 23 of a V-shape is formed at a position that is located on the outer surface of the corner portion 4, which position is higher than an upper position of the connecting surface 20 connected to the glass-run vertical portion 3, and is located at a directly below position of the corner hollow lip portion 21. That is, the groove 23 is located at a position corresponding to an extension line of a lower peripheral portion of the outer lip 11 of the glass-run horizontal portion 2, and the groove 23 is smoothly formed in the area corresponding to the lateral length of the glass-run vertical portion 3. Due to the groove 23, the thickness of the corner portion 4 corresponding to the groove 23 is thinner than other portions of the corner portion 4.

Herein, since it is necessary to use a core during a molding in order to form a hollow space of the corner hollow lip portion 21, an end surface of the corner hollow lip portion 21 has an opening as a core pick-up hole 14a of the hollow space 14 as shown in FIG. 2.

Accordingly, with the thus arranged structure of the glass run according to the present invention, when the door glass 5 guided by the glass-ran vertical portion 3 is raised up to an upper limit position, the upper end portion of the door glass 5 is press-contacted with the seal surface 13 of the hollow lip 8 of the glass-run horizontal portion 2 and the corner hollow lip portion 21 of the corner portion 4 so as to deform the glass-run horizontal portion 2 upward. Although tensile force due to the force of the door glass 5 is applied to the corner portion 4 during this time, a relatively large deformation is occurred in the vicinity of the groove 23 so as to decrease the depth of the groove 23 and to increase the width of the groove 23. Therefore, since almost all of the tensile force applied to the corner portion 4 is received by the deformation of the groove 23 of the corner portion 4, the load applied to the second connecting surface 20 becomes small. This prevents the second connecting surface 20 from generating a crack due to stress concentration. Although the groove 23 is exposed at an outside surface of the door glass run 1, since the position of the groove 23 is located on the extension line of a lower periphery of the outside lip 11 of the glass-run horizontal portion 2, the outside view of the door glass run 1 remains aesthetically pleasing.

With the thus arranged structure according to the present invention, even if stretching deformation of the glass-run vertical portion in the longitudinal direction is suppressed by the embedding of a C-shaped core into the glass-run vertical portion, it becomes possible to prevent the concentration of stress to the connecting surface. Further, since the groove of the corner portion is generally located on an extension line of a lower periphery of the outer side of the glass-run horizontal portion, the groove never degrades an external appearance of the vehicle body.

While the invention has been particularly shown and described with reference to the preferred embodiment thereof, it will be understood by those skilled in the art that the foregoing and other changes in form and details can be made therein without departing from the spirit and scope of the invention.

What is claimed is:

1. A glass run disposed along an inner periphery of a door frame of a vehicle door, comprising:

a glass-run horizontal portion receiving a press force of a door glass when the door glass is fully raised up;

a glass-run vertical portion guiding a side of the door glass; and a corner portion connecting said glass-run horizontal portion and said glass-run vertical portion, said corner portion including a first connecting surface between said glass-run horizontal portion and said corner portion, a second connecting surface between said glass-run vertical portion and said corner portion, and a groove which is formed on an outer surface of said corner portion so as to extend along an extension line of a lower periphery of an outer side of said glass-run horizontal portion, a thickness of said corner portion corresponding to the groove being formed thinner than other portions of said corner portion, the second connecting surface being located at a position which is lower than an outer lower periphery of said glass-run horizontal portion.

2. A glass run as claimed in claim 1, wherein said glass-run vertical portion has a C-shaped cross section and includes a U-shaped core embedded therein.

3. A glass run as claimed in claim 1, wherein said glass-run horizontal portion has a hollow lip at which an upper end portion of the door glass is received, the hollow lip being constituted by an outer lip, a main body, a support lip and a seal lip.

4. A glass run as claimed in claim 3, wherein the seal lip is made of sponge rubber, and another part of said glass-run horizontal portion is made of solid rubber.

5. A glass run as claimed in claim 1, wherein the groove is formed as a V-shape having a first side wall and a second side wall which are connected to each other at one end and which extend laterally from each other to form the V-shape, and wherein, when the door glass is fully raised up, a width of the groove is increased by virtue of the press force causing the first side wall and the second side wall to be separated further from each other than when the door glass in not fully raised up.

6. A glass run as claimed in claim 5, wherein, when the door glass is fully raised up, a depth of the groove is less than when the door glass is not fully raised up.

7. A glass run as claimed in claim 6, wherein said vehicle door has an inner surface forming a portion of an inner chamber of a vehicle, and said vehicle door has an outer surface forming a first portion of an exterior surface of said vehicle, and wherein the outer surface of said corner portion forms a second portion of the exterior surface of said vehicle.

8. A glass run disposed along an inner periphery of a door frame of a vehicle door, comprising:

a glass-run horizontal portion receiving compression force of a door glass when the door glass is fully raised up, said glass-run horizontal portion including an inner part, an outer part and an installing part;

a glass-run vertical portion guiding a side of the door glass, said glass-run vertical portion including an inner part, an outer part and an installing part; and a corner portion connecting said glass-run horizontal portion and said glass-run vertical portion, said corner portion including a first connecting surface between said glass-run horizontal portion and said corner portion, a second connecting surface between said glass-run vertical portion and said corner portion, and a groove which is formed on an outer surface of said corner portion so as to extend along an extension line of a lower periphery of the outer part of said glass-run horizontal portion, the second connecting surface being located at a position which is lower than the lower periphery of the outer part of said glass-run horizontal portion.

9. A glass run as claimed in claim 8, wherein said glass-run vertical portion has the second connecting surface which includes a first step located at the outer part of said glass-run vertical portion and a second step located at the inner part of said glass-run vertical portion, the first step being formed to be higher in height level than the second step.

10. A glass run as claimed in claim 8, wherein said glass-run vertical portion has a C-shaped cross section and includes a U-shaped core embedded therein, said glass-run horizontal portion having a hollow lip at which an upper end portion of the door glass is received, the hollow lip being constituted by an outer lip, a main body, a support lip and a seal lip, the seal lip being made of sponge rubber and another part of said glass-run horizontal portion being made of solid rubber.

11. A glass run as claimed in claim 8, wherein the groove is formed as a V-shape having a first side wall and a second side wall which are connected to each other at one end and which extend laterally from each other to form the V-shape, and wherein, when the door glass is fully raised up, a width of the groove is increased by virtue of the press force causing the first side wall and the second side wall to be separated further from each other than when the door glass in not fully raised up.

12. A glass run as claimed in claim 11, wherein, when the door glass is fully raised up, a depth of the groove is less than when the door glass is not fully raised up.

13. A glass run as claimed in claim 12, wherein said vehicle door has an inner surface forming a portion of an inner chamber of a vehicle, and said vehicle door has an outer surface forming a first portion of an exterior surface of said vehicle, and wherein the outer surface of said corner portion forms a second portion of the exterior surface of said vehicle.

* * * * *